(12) United States Patent
Morgan et al.

(10) Patent No.: US 10,390,405 B2
(45) Date of Patent: Aug. 20, 2019

(54) SYSTEMS AND METHODS OF LED COLOR OVERLAP

(71) Applicant: TEXAS INSTRUMENTS INCORPORATED, Dallas, TX (US)

(72) Inventors: Dan Morgan, Denton, TX (US); Paulo Pinheiro, Frisco, TX (US)

(73) Assignee: Texas Instruments Incorporated, Dallas, TX (US)

( * ) Notice: Subject to any disclaimer, the term of this patent is extended or adjusted under 35 U.S.C. 154(b) by 259 days.

(21) Appl. No.: 15/206,908

(22) Filed: Jul. 11, 2016

(65) Prior Publication Data
US 2017/0041998 A1 Feb. 9, 2017

Related U.S. Application Data

(63) Continuation of application No. 13/189,490, filed on Jul. 23, 2011, now Pat. No. 9,392,662.

(51) Int. Cl.
| | |
|---|---|
| *H04N 9/31* | (2006.01) |
| *G03B 21/20* | (2006.01) |
| *G03B 33/06* | (2006.01) |
| *H05B 33/08* | (2006.01) |

(52) U.S. Cl.
CPC ..... *H05B 33/0857* (2013.01); *G03B 21/2033* (2013.01); *G03B 33/06* (2013.01); *H04N 9/3158* (2013.01); *H05B 33/086* (2013.01); *H05B 33/0815* (2013.01); *H05B 33/0827* (2013.01)

(58) Field of Classification Search
CPC .................................. G05F 1/00; H05B 37/02
USPC ............................................. 353/31; 315/185
See application file for complete search history.

(56) References Cited

U.S. PATENT DOCUMENTS

| | | | |
|---|---|---|---|
| 2004/0036418 A1* | 2/2004 | Rooke et al. ................... 315/77 |
| 2008/0094000 A1* | 4/2008 | Yamamoto et al. .......... 315/250 |
| 2009/0231552 A1* | 9/2009 | Huber et al. .................... 353/85 |
| 2011/0204778 A1* | 8/2011 | Sadwick et al. ................ 315/34 |

* cited by examiner

*Primary Examiner* — Steven Whitesell Gordon
*Assistant Examiner* — Jerry L Brooks
(74) *Attorney, Agent, or Firm* — Tuenlap Chan; Charles A. Brill; Frank D. Cimino

(57) ABSTRACT

The disclosed systems and methods emphasize driving LEDs in series and in parallel with the same LED driver chip and a single inductor. For creating overlap, the systems and methods of LED color overlap disclosed herein take advantage of the fact that green and blue LEDs have the same voltage. Thus, green and blue LEDs can be driven in parallel as needed. LED suppliers can screen parts for sufficiently close voltage matching between green and blue LEDs. This is especially true when using green LED die based on a blue die with a green phosphor. Cyan may be produced by driving a green LED and a blue LED in parallel. White may produced by driving a green LED and a blue LED in parallel and a red LED in series with this green and blue parallel pair.

15 Claims, 4 Drawing Sheets

SYSTEMS AND METHODS OF LED COLOR OVERLAP

CROSS-REFERENCE TO RELATED APPLICATIONS

This patent application is a continuation of U.S. Nonprovisional application Ser. No. 13/189,490, filed Jul. 23, 2011 (now U.S. Pat. No. 9,392,662), which is incorporated herein by reference in its entirety for all purposes.

TECHNICAL FIELD

The present disclosure is generally related to light emitting diodes (LEDs) and, more particularly, is related to LED drivers.

BACKGROUND

A light-emitting diode is a semiconductor light source. LEDs are used as indicator lamps in many devices and are increasingly used for other lighting. Introduced as a practical electronic component in 1962, early LEDs emitted low-intensity red light; but modern versions are available across the visible, ultraviolet and infrared wavelengths, with very high brightness.

When a light-emitting diode is forward biased (switched on), electrons are able to recombine with electron holes within the device, releasing energy in the form of photons. This effect is called electroluminescence and the color of the light (corresponding to the energy of the photon) is determined by the energy gap of the semiconductor. An LED is often small in area (less than 1 mm2), and integrated optical components may be used to shape its radiation pattern. LEDs present many advantages over incandescent light sources including lower energy consumption, longer lifetime, improved robustness, smaller size, faster switching, and greater durability and reliability. LEDs powerful enough for room lighting are relatively expensive and require more precise current and heat management than compact fluorescent lamp sources of comparable output.

Light-emitting diodes are used in applications as diverse as replacements for aviation lighting, automotive lighting (particularly brake lamps, turn signals and indicators) as well as in traffic signals. The compact size, the possibility of narrow bandwidth, switching speed, and extreme reliability of LEDs has allowed new text and video displays and sensors to be developed, while their high switching rates are also useful in advanced communications technology. Infrared LEDs are also used in the remote control units of many commercial products including televisions, DVD players, and other domestic appliances. Recent strides have been accomplished in introducing LEDs into projectors, including digital light processing projectors. LED Drivers in projectors that support color overlap for yellow, cyan, magenta, and white, using red, green, and blue LEDs, normally require three LED driver chips so that two LEDs can be driven at the same time. For example, to achieve yellow, the red LED driver and green LED driver are enabled at the same time. The three LED driver chips, and the three inductors to go with them, are expensive and large in size. This is an issue, especially in small pico-projectors such as those embedded in cell phones. Therefore, there are heretofore unaddressed needs with previous solutions.

SUMMARY

Example embodiments of the present disclosure provide systems of LED color overlap. Briefly described, in architecture, one example embodiment of the system, among others, can be implemented as follows: a controller module configured to be connected to a plurality of light emitting diodes (LEDs), the LEDs emitting a plurality of individual colors, the controller further configured to drive at least two of the plurality of LEDs simultaneously to achieve a color not supplied by an individual LED of the plurality of LEDs.

Embodiments of the present disclosure can also be viewed as providing methods for LED color overlap. In this regard, one embodiment of such a method, among others, can be broadly summarized by the following steps: receiving a signal that selects a color; and configuring light emitting diodes (LEDs) to be driven in combination simultaneously to achieve a selected color.

BRIEF DESCRIPTION OF THE DRAWINGS

FIG. 5 is a flow diagram of an example embodiment of a method of LED color overlap.

DETAILED DESCRIPTION

Figure 1:
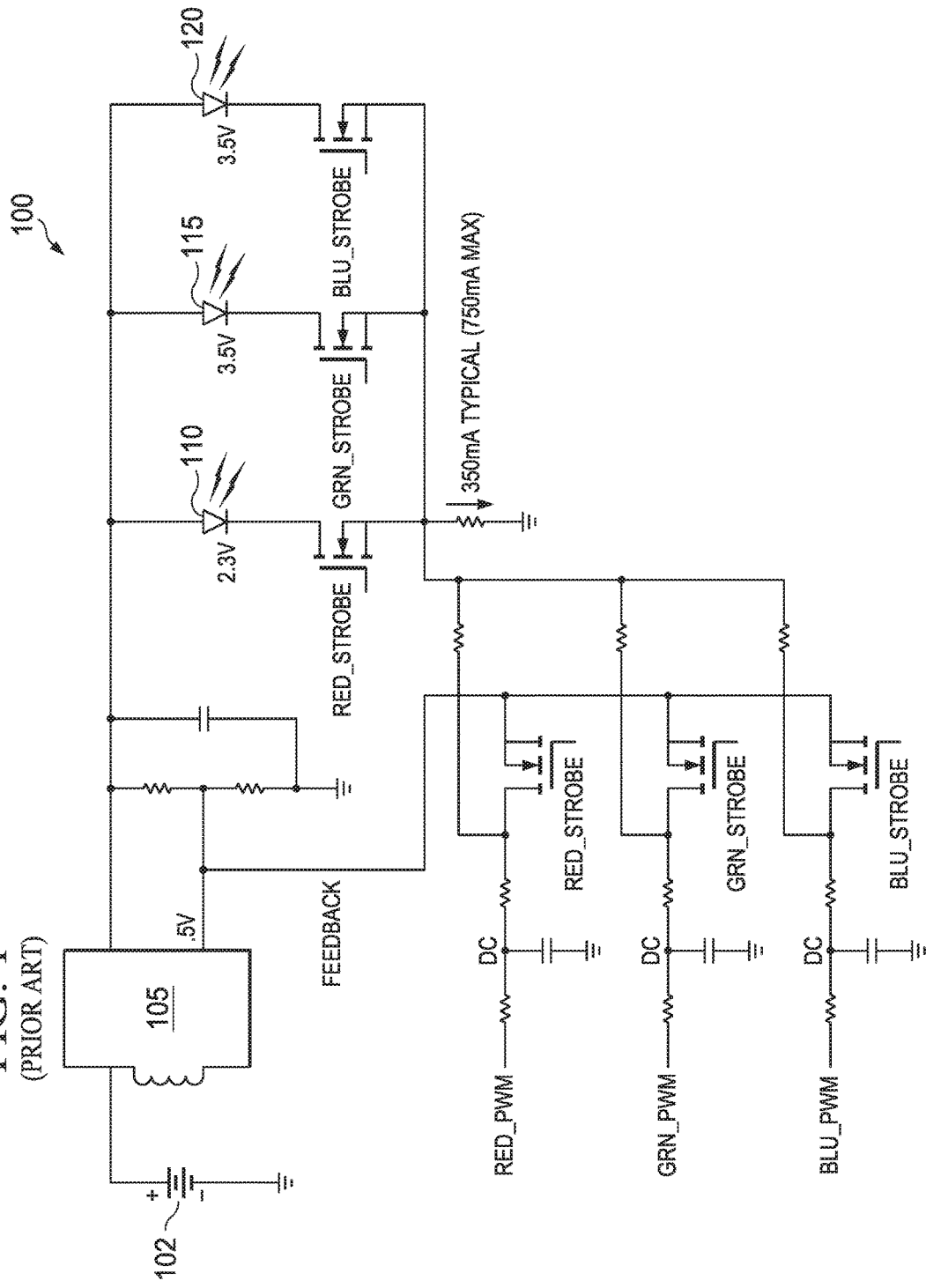
FIG. 1 is a circuit diagram of an example embodiment of a prior art circuit for driving LEDs.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Basically, any color light, and even white light, can be formed by mixing differently colored lights; the most common method is to use red, green and blue (RGB). A device used to create white light may be called a multi-colored white LED (sometimes referred to as a Red Green Blue LED). Because these need electronic circuits to control the blending and diffusion of different colors, they have not been regularly used to produce white lighting. Nevertheless, this method is particularly interesting in many uses because of the flexibility of mixing different colors, and, in principle, this mechanism also has higher quantum efficiency in producing white light. Two common semiconductor materials used to make LEDs are aluminum gallium arsenide (AlGaAs) for red LEDs and indium gallium nitride (InGaN) for blue and green LEDs. Conventional LEDs are made from a variety of inorganic semiconductor materials. The following table shows the available colors vs. materials:

TABLE 1

| Color | Wavelength [nm] | Voltage [V] | Semiconductor material |
|---|---|---|---|
| Infrared | $\lambda > 760$ | $\Delta V < 1.9$ | Gallium arsenide (GaAs) |
|  |  |  | Aluminium gallium arsenide (AlGaAs) |
| Red | $610 < \lambda < 760$ | $1.63 < \Delta V < 2.03$ | Aluminium gallium arsenide (AlGaAs) |
|  |  |  | Gallium arsenide phosphide (GaAsP) |
|  |  |  | Aluminium gallium indium phosphide (AlGaInP) |
|  |  |  | Gallium(III) phosphide (GaP) |
| Orange | $590 < \lambda < 610$ | $2.03 < \Delta V < 2.10$ | Gallium arsenide phosphide (GaAsP) |
|  |  |  | Aluminium gallium indium phosphide (AlGaInP) |
|  |  |  | Gallium(III) phosphide (GaP) |
| Yellow | $570 < \lambda < 590$ | $2.10 < \Delta V < 2.18$ | Gallium arsenide phosphide (GaAsP) |
|  |  |  | Aluminium gallium indium phosphide (AlGaInP) |
|  |  |  | Gallium(III) phosphide (GaP) |
| Green | $500 < \lambda < 570$ | $1.9^{[47]} < \Delta V < 4.0$ | Indium gallium nitride (InGaN)/Gallium(III) nitride (GaN) |
|  |  |  | Gallium(III) phosphide (GaP) |
|  |  |  | Aluminium gallium indium phosphide (AlGaInP) |
|  |  |  | Aluminium gallium phosphide (AlGaP) |
| Blue | $450 < \lambda < 500$ | $2.48 < \Delta V < 3.7$ | Zinc selenide (ZnSe) |
|  |  |  | Indium gallium nitride (InGaN) |
|  |  |  | Silicon carbide (SiC) as substrate |
|  |  |  | Silicon (Si) as substrate - (under development) |
| Violet | $400 < \lambda < 450$ | $2.76 < \Delta V < 4.0$ | Indium gallium nitride (InGaN) |
| Purple | multiple types | $2.48 < \Delta V < 3.7$ | Dual blue/red LEDs, |
|  |  |  | blue with red phosphor, |
|  |  |  | or white with purple plastic |
| Ultraviolet | $\lambda < 400$ | $3.1 < \Delta V < 4.4$ | Diamond (235 nm) |
|  |  |  | Boron nitride (215 nm) |
|  |  |  | Aluminium nitride (AlN) (210 nm) |
|  |  |  | Aluminium gallium nitride (AlGaN) |
|  |  |  | Aluminium gallium indium nitride (AlGaInN) - (down to 210 nm) |
|  | Broad spectrum | $\Delta V = 3.5$ | Blue/UV diode with yellow phosphor |

Multi-color LEDs offer not merely another means to form white light, but a new means to form light of different colors. Most perceivable colors may be formed by mixing different amounts of three primary colors. This allows precise dynamic color control. Using dedicated secondary colors provides brighter illumination than from illumination using just the three colors. With the red, blue and green system, three drivers or three chips have been typically used—one for driving each of the red, blue, and green LEDs. With LEDs specifically, the LED drivers on the market today will use an inductor for each driver because they generally use switching regulator architectures. Circuits with three chips and three inductors tend to get large and expensive. In applications such as pico-projectors, the miniaturization of the design and achieving lower cost are primary design factors. By using one driver chip instead of three driver chips, the design area and the cost saved by using one chip and one inductor may be increased, often dramatically. In using the disclosed systems and methods of LED color overlap, to illuminate red, the red LED is driven and turned off; to illuminate green, the green LED is driven and turned off; to illuminate blue, the blue LED is driven and turned off. But to illuminate yellow, red and green are driven in series. The driving voltage is then higher to drive the two LEDs in series. The disclosed systems and methods of LED color overlap may be implemented with one chip and one inductor to produce red, blue, green, yellow, cyan, magenta, white, etc.—basically, any primary color or secondary color as well as white. Although this works for pico-projectors, it can be used for other applications as well.

Example embodiments of the disclosed systems and methods of LED color overlap enable the use of a single LED driver chip and a single inductor to drive two or more LEDs simultaneously to achieve color overlap. In an example embodiment, a single switching regulator, for example a buck-boost switching regulator, can drive more than one LED by using six field effect transistor (FET) switches, for example. Although a buck-boost regulator is used in example embodiments, other switching regulators may be used depending on many factors, including the input voltage, output voltage, output current, and cost, among others. Linear regulator topologies and other topologies may be implemented as well. The six FET switches may be used to turn on more than one LED in series, in parallel, or in series and parallel such that they are illuminated substantially simultaneously.

Driving LEDs in parallel to create color overlap introduces a potential issue because not all LEDs are driven with the same voltage. The forward voltage ($V_f$) of the red LED does not match the $V_f$ of the green LED or of the blue LED. The red LED semiconductor material is fundamentally different from the semiconductor material for green and blue LEDs, for example. Typical voltages @350 mA are: red: 2.3V, green: 3.3V, and blue: 3.3V.

Thus, in an example embodiment, it is desirable to drive the red LED in series with the other LEDs as needed to create secondary colors and white. Driving the red LED in parallel with blue and/or green may cause a mismatch in output voltages. Driving the red LED in series with the green LED results in yellow illumination. Driving the red LED in series with the blue LED results in magenta illumination.

For creating overlap, the systems and methods of LED color overlap disclosed herein take advantage of the fact that green and blue LEDs have the same voltage. Thus, green and blue LEDs can be driven in parallel as needed. LED suppliers can screen parts for sufficiently close voltage matching between green and blue LEDs. This is especially true when using a green LED die based on a blue die with a green phosphor. Cyan may be produced by driving a green LED and a blue LED in parallel. White may produced by driving a green LED and a blue LED in parallel and a red LED in series with this green and blue parallel pair.

In an alternative embodiment, to solve the red $V_f$ mismatch problem, red illumination may be produced by coating a blue LED semiconductor die with a red phosphor. In this case all LEDs may be driven in parallel to create yellow, cyan, magenta, or white while avoiding the series configuration. To achieve yellow, a red LED and a green LED are driven in parallel. To achieve cyan, a green LED and a blue LED are driven in parallel. To achieve magenta, a red LED and a blue LED are driven in parallel. To achieve white, a red LED, a green LED, and a blue LED are driven in parallel.

An example embodiment employs a "RGBYCMW duty cycle on the fly" algorithm, in which LED duty cycles are set dynamically frame by frame. The LED driving currents may also be adjusted frame by frame and may be set substantially synchronously with color transitions (FET switch transitions). The disclosed systems and methods of LED color overlap may also include programmable currents that change substantially synchronously with the FET switch transitions. The same control signals that activate the FET switch transitions also activate the synchronous change of LED current at the start of each color frame.

A switching regulator may be used to drive the LEDs. Selecting a switching regulator topology is dependent on the input voltages, the output voltages, and the output current. In the voltage versus current curves for an LED, as with a typical diode, the voltage is a very narrow band, so the current changes dramatically outside of that driving or conduction voltage band. So the LED has to be driven at a fairly specific voltage. In an example embodiment, a current sense resistor is used to determine the driving voltage of the LED. If the desired LED current through the sense resistor is 300 milliamps, the driving voltage of the LED is adjusted until the current resistor is at substantially 300 milliamps. In this sense, the switching regulator works like a current regulator. So when an LED is driven, the driving current is considered rather than the voltage.

Improvements in image brightness can be achieved by operating in at least on of constant power mode and constant current mode, among others. I constant power mode, the total LED power is held constant, thereby increasing the LED's quantum efficiency. This mode may typically be used in a power-constrained application such as a cell phone. In constant current mode, LEDs may be driven at the maximum currents allowed by the LED manufacturer. Color overlap allows the LEDs to be on longer and thus run at higher power which results in higher brightness. This mode may be used in larger portable projectors that include fans where LED power consumption is less critical.

FIG. 1 provides example circuit 100 of the prior art. Circuit 100 includes power supply 102 for powering switching regulator 105 implemented to drive red LED 110, green LED 115, and blue LED 120. To illuminate red LED 110, the red strobe signal is turned on. The red strobe signal turns on the red strobe FETs allowing red LED 110 to be illuminated and the feedback sensed by switching regulator 105 so that red LED 110 can be driven at the appropriate voltage. The red PWM signal allows for programmable control of the current of red LED 110. This PWM signal may be used to drive an RC circuit that filters out the PWM AC signal. The output of the RC circuit is thus a DC level with a negligible ripple. This DC level, when summed with the feedback signal, sets the voltage for the LED as needed to give the desired LED current. Likewise, to illuminate green LED 115, the green strobe signal is turned on. The green strobe signal turns on the green strobe FETs allowing green LED 115 to be illuminated and the feedback sensed by switching regulator 105 so that green LED 115 can be driven at the appropriate voltage. To illuminate blue LED 120, the blue strobe signal is turned on. The blue strobe signal turns on the blue strobe FETs allowing blue LED 120 to be illuminated and the feedback sensed by switching regulator 105 so that blue LED 120 can be driven at the appropriate voltage. This circuit is not useful for driving the LEDs in parallel because it involves time-sharing of one switching regulator IC for three separate colors. A problem with this configuration is that the red LED forward voltage does not match the forward voltage of the green LED or the blue LED so colors using combinations with red are not effectively attainable.

Figure 2:
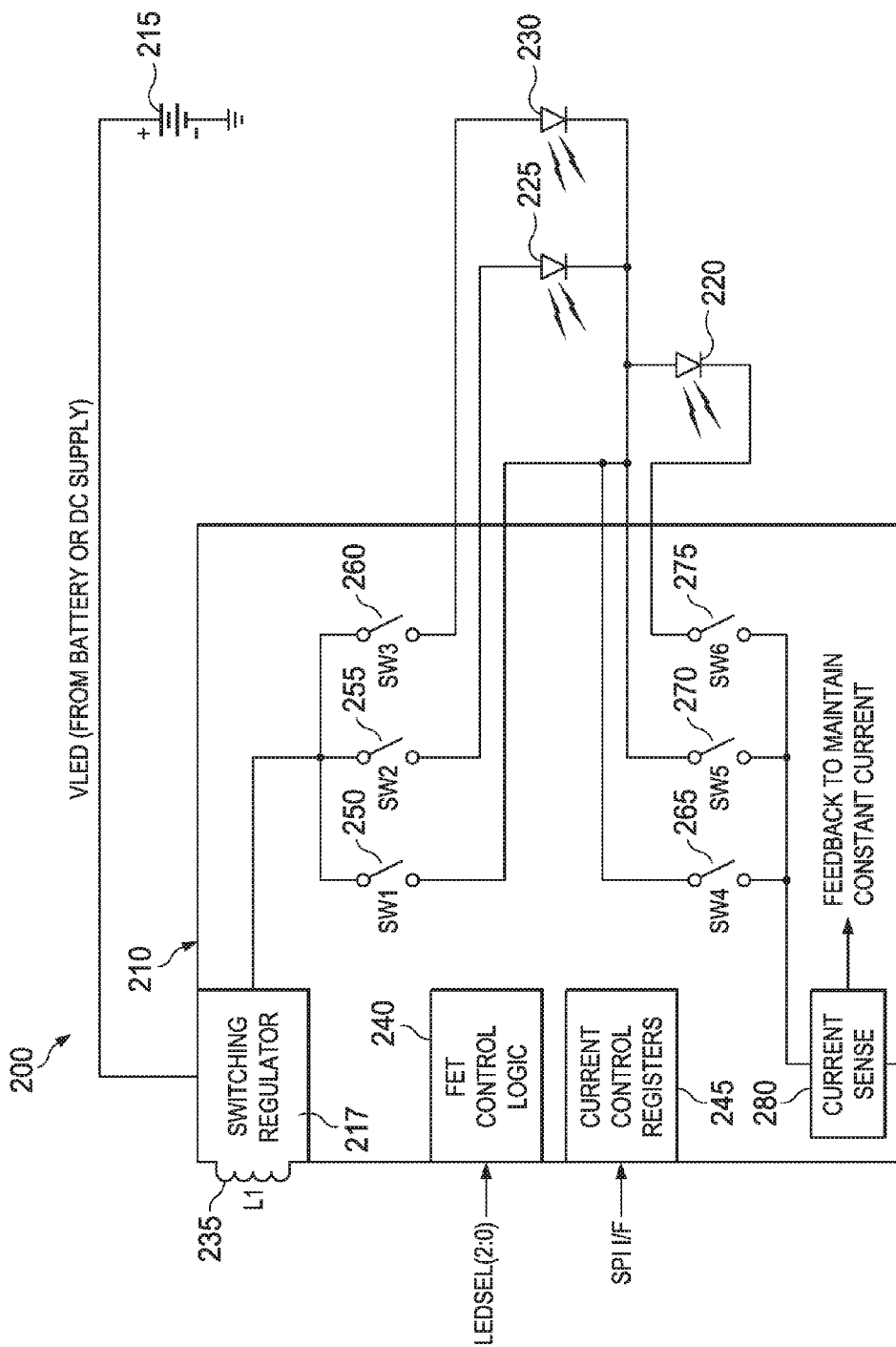
FIG. 2 is a circuit diagram of an example embodiment of a system for LED color overlap.

FIG. 2 provides circuit 200 which takes advantage of the similar forward voltage of the green LED and the blue LED. Thus the green LED and the blue LED can be driven in parallel as needed and in series with the red LED. LED suppliers can screen parts for sufficiently close voltage matching between the green LEDs and the blue LEDs. This is especially true when using a green LED die based on a blue die with a green phosphor. A single switching regulator can drive more than one LED by using a plurality of FET switches. In an example embodiment, 6 switches are used to configure the LEDs to achieve red, blue, green, cyan, magenta, yellow, and white. The six FET switches may be used to turn on more than one LED in series, in parallel, or in series and parallel at the same time. In an alternative embodiment, a red illumination may be achieved using a blue die with a red phosphor. In this case, all LEDs may be driven in parallel and series driving may be unnecessary.

In the example embodiment of FIG. 2, voltage source 215 powers switching regulator 217 of module 210. Switching regulator 217 may connect to a single inductor, for example inductor 235. Switching regulator 217 drives three switches 250, 255, and 260. In an example embodiment, switches 250, 255, and 260 are FETs, but could be fabricated in other technologies or using other topologies. The outputs of switches 250, 255, and 260 may be connected to LEDs 220, 225, and 230, which are red, blue, and green respectively. In an example embodiment, blue LED 225, and green LED 230 are configured in parallel. The parallel pair of blue LED 225 and green LED 230 is configured in series with red LED 220. In this example implementation, FETs 265 and 270 are connected in series with blue LED 225 and green LED 230, and FET 275 is connected in series with red LED 220. FETs 265, 370, and 275 are also in series with current sensor 280, for example, a current sense resistor. The color to be illuminated is indicated through FET control logic 240. In an example embodiment, 3 signal lines are used to configure switches 250, 255, 260, 265, 270, and 275. An example embodiment of the LED select signals used in the circuit of FIG. 2, and the resulting switch settings are listed in Table 2.

TABLE 2

|  | LED Select Signals | | | Resulting Switch Settings | | | | | |
| --- | --- | --- | --- | --- | --- | --- | --- | --- | --- |
| Color | LED_SEL2 | LED_SEL1 | LED_SEL0 | SW1 | SW2 | SW3 | SW4 | SW5 | SW6 |
| All off | 0 | 0 | 0 | 0 | 0 | 0 | 0 | 0 | 0 |
| Red | 0 | 0 | 1 | 1 | 0 | 0 | 0 | 0 | 1 |
| Green | 0 | 1 | 0 | 0 | 0 | 1 | 1 | 1 | 0 |
| Blue | 0 | 1 | 1 | 0 | 1 | 0 | 1 | 1 | 0 |
| Yellow | 1 | 0 | 0 | 0 | 0 | 1 | 0 | 0 | 1 |
| Cyan | 1 | 0 | 1 | 0 | 1 | 1 | 1 | 1 | 0 |
| Magenta | 1 | 1 | 0 | 0 | 1 | 0 | 0 | 0 | 1 |
| White | 1 | 1 | 1 | 0 | 0 | 0 | 1 | 1 | 1 |

For example, to achieve a yellow illumination, switches 250, 255, 265, and 270 are open and switches 260 and 275 are closed. This turns on green LED 230 and red LED 220 in series to produce yellow. To achieve a magenta illumination, switches 250, 260, 265, and 270 are open and switches 255 and 275 are closed. This turns on blue LED 225 and red LED 220 in series to produce magenta.

Figure 3:
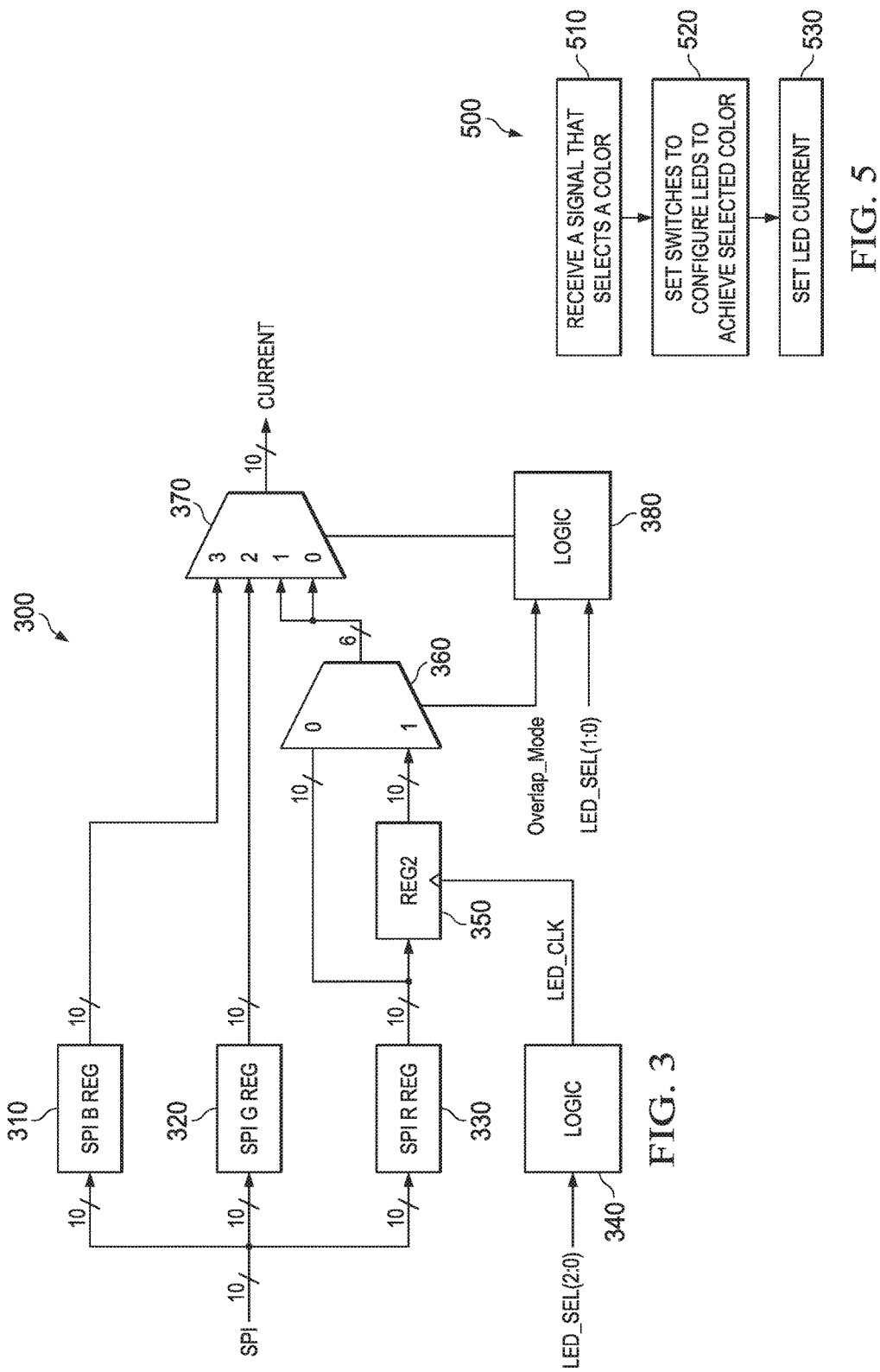
FIG. 3 is a circuit diagram of an example embodiment of the registers used to set current in the circuit of FIG. 2.

In an example embodiment, the current is sensed and compared to the value supplied by current control registers 245 which are shown in more detail in FIG. 3. In an example embodiment, a current mode regulator is used for switching regulator 217. A voltage mode regulator may be used with the feedback being supplied by a current sense resistor to virtually run the voltage mode regulator in current mode.

In the example embodiment of the current control registers provided in FIG. 3, if red, green, and blue are the only colors being used, three registers SPI B Reg 310, SPI G Reg 320, and SPI Red Reg 330 may be used. In an RGB system, the current for red is loaded in SPI Red Reg 330, the current for green is loaded in SPI G Reg 320, and the current for blue is loaded in SPI B Reg 310. However, when a secondary color is selected, SPI R Reg 330 becomes a generic register and may be dynamically updated. The output of SPI R Reg 330 loads into Reg 2 350 and then goes to multiplexer 360. In an example embodiment, software may be used to dynamically set the current color by color. The final value, which in an example embodiment is a 10-bit resolution, to control the LED currents is present at the output of multiplexer 370. This 10-bit value may be fed to a digital to analog converter. The analog output of the digital to analog converter may serve as a control voltage for setting the LED current. This control voltage, along with the voltage from feedback sense signal 480 of FIG. 4, serves to set the output of a voltage regulator to maintain the target current.

Figure 4:
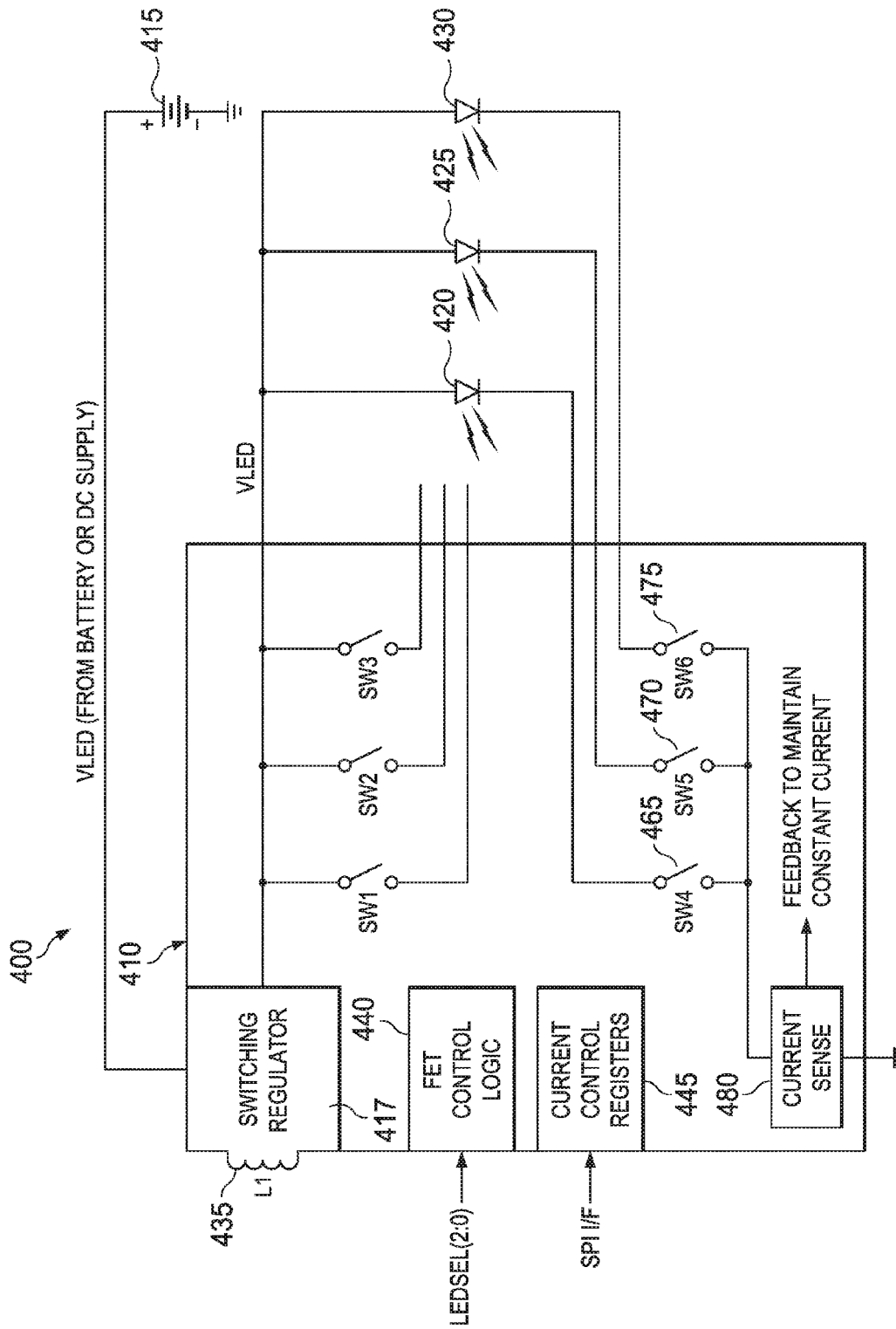
FIG. 4 is a circuit diagram of an example embodiment of the control logic used in the system for LED color overlap of FIG. 2.

In the example embodiment of circuit 400 in FIG. 4, red LED 420, blue LED 425, and green LED 430 are connected in common anode configuration, all three in parallel. In this embodiment, the top switches are not used and the anodes of the LEDs are each connected to the output of switching regulator 417 which uses a single inductor, such as inductor 435. In this example implementation, FETs 465, 470, and 475 are connected in series with red LED 420, blue LED 425 and green LED 430, respectively. FETs 465, 470, and 475 are also in series with current sensor 480, for example, a current sense resistor. The color to be illuminated is indicated through FET control logic 440. In an example embodiment, 3 signal lines are used to configure switches 465, 470, and 475. An example embodiment of the LED select signals used in the circuit of FIG. 4, and the resulting switch settings are listed in Table 3.

TABLE 3

|  | LED Select Signals | | | Resulting Switch Settings | | | | | |
| --- | --- | --- | --- | --- | --- | --- | --- | --- | --- |
| Color | LED_SEL2 | LED_SEL1 | LED_SEL0 | SW1 | SW2 | SW3 | SW4 | SW5 | SW6 |
| All off | 0 | 0 | 0 | 0 | 0 | 0 | 0 | 0 | 0 |
| Red | 0 | 0 | 1 | 0 | 0 | 0 | 1 | 0 | 0 |
| Green | 0 | 1 | 0 | 0 | 0 | 0 | 0 | 0 | 1 |
| Blue | 0 | 1 | 1 | 0 | 0 | 0 | 0 | 1 | 0 |
| Yellow | 1 | 0 | 0 | 0 | 0 | 0 | 1 | 0 | 1 |
| Cyan | 1 | 0 | 1 | 0 | 0 | 0 | 0 | 1 | 1 |
| Magenta | 1 | 1 | 0 | 0 | 0 | 0 | 1 | 1 | 0 |
| White | 1 | 1 | 1 | 0 | 0 | 0 | 1 | 1 | 1 |

For example, to achieve a yellow illumination, switch 470 is open and switches 465 and 475 are closed. This turns on green LED 430 and red LED 420 in parallel to produce yellow. To achieve a magenta illumination, switch 475 is open and switches 465 and 470 are closed. This turns on blue LED 425 and red LED 420 in parallel to produce magenta. The current is again set using the circuit of FIG. 3.

FIG. 5 provides flow diagram 500 of an example embodiment of a method of LED color overlap. In block 510, a signal is received that selects a color to be illuminated. In block 520, switches are set to configure the LEDs to achieve the selected color. In block 530, the current is set to drive the selected LEDs.

Although the present disclosure has been described in detail, it should be understood that various changes, substitutions and alterations can be made thereto without departing from the spirit and scope of the disclosure as defined by the appended claims. For example, the disclosed methods and systems may be used in laser applications as well. The system may be configured in substantially the same manner, except that the laser materials and voltages may be different.

Therefore, at least the following is claimed:
1. A device comprising:
a controller configured to control a switching regulator; wherein the controller is configured to be connected to a
single inductor and configured to be connected to a plurality of light emitting diodes (LEDs), and wherein the plurality of LEDs include a first LED configured in parallel with a second LED, the first LED and second LED configured in series with a third LED, the plurality of LEDs to emit a plurality of individual colors;

wherein the controller is further configured to drive at least two of the plurality of LEDs simultaneously to achieve a color not supplied by an individual LED of the plurality of LEDs;

wherein the controller is configured to compare a first current value through the at least two of the plurality of LEDs with a second current value;

wherein the controller includes at least one current control register; and wherein the controller is configured to store the second current value in the at least one current control register.

2. The device of claim 1, wherein the controller includes the switching regulator configured to supply power to the plurality of LEDs.

3. The device of claim 2, wherein the controller includes:
a plurality of field effect transistors (FETs) configured to select the at least two of the plurality of LEDs;
FET control logic to control switching of the FETs;
the current control register for controlling the first current value through the at least two of the plurality of LEDs; and
a current sense resistor configured to sense the first current value through the at least two of the plurality of LEDs.

4. The device of claim 2, wherein the first LED is a green LED, wherein the second LED is a blue LED, and wherein the third LED is a red LED.

5. The device of claim 1, further including:
a first switch connected in series between a power source and the first LED;
a second switch connected in series between the power source and the second LED;
a third switch connected in series between the power source and the third LED;
a fourth switch connected between the third switch and ground; and
a fifth switch connected between the third LED and ground.

6. The device of claim 5, further including a current sense resistor connected between the fifth switch and ground and between the fourth switch and ground.

7. A method, comprising:
receiving a signal that selects a color;
configuring a plurality of light emitting diodes (LEDs) to be driven in combination simultaneously to achieve a selected color, wherein the plurality of LEDs includes a first LED configured in parallel with a second LED, the first LED and second LED configured in series with a third LED;
driving the plurality of LEDs with a single switching regulator connected to a single inductor; and
comparing a first current value through the plurality of LEDs with a second current value to be stored in a current control register.

8. The method of claim 7, wherein the first LED is a blue LED, wherein the second LED is a green LED, and wherein the third LED is a red LED.

9. The method of claim 8, further including driving the third LED and first LED simultaneously to create yellow.

10. The method of claim 7, further including sensing the first current value through the plurality of LEDs and controlling the first current value through the plurality of LEDs to maintain a constant current.

11. A projector comprising:
a plurality of light emitting diodes (LEDs), wherein the plurality of LEDs include a first LED configured in parallel with a second LED, and wherein the first LED and second LED configured are series with a third LED; and
a controller configured to control a switching regulator, to be connected to a single inductor, and to be connected to the plurality of LEDs, the plurality of LEDs emitting a plurality of individual colors, the controller further configured to drive at least two of the plurality of LEDs simultaneously to achieve a color not supplied by an individual LED of the plurality of LEDs, wherein the controller is configured to compare a first current value through the at least two of the plurality of LEDs with a second current value, wherein the controller includes at least one current control register, and wherein the controller is configured to store the second current value in the at least one current control register.

12. The projector of claim 11, wherein the controller includes the switching regulator configured to supply power to the plurality of LEDs.

13. The projector of claim 11, wherein the controller includes:
a plurality of field effect transistors (FETs) configured to select the at least two of the plurality of LEDs;
FET control logic to control switching of the FETs;
the current control register for controlling the first current value through the at least two of the plurality of LEDs; and
a current sense resistor configured to sense the first current value through the at least two of the plurality of LEDs.

14. The projector of claim 11, wherein the first LED is a green LED, wherein the second LED is a blue LED, and wherein the third LED is a red LED.

15. The projector of claim 14, further including:
a first switch connected in series between a power source and the first LED;
a second switch connected in series between the power source and the second LED;
a third switch connected in series between the power source and the third LED;
a fourth switch connected between the third switch and ground; and
a fifth switch connected between the third LED and ground.

* * * * *